United States Patent [19]

Lazzari et al.

[11] E Re. 29,326

[45] Reissued July 26, 1977

[54] INTEGRATED MAGNETIC HEAD HAVING ALTERNATE CONDUCTING AND INSULATING LAYERS WITHIN AN OPEN LOOP OF TWO MAGNETIC FILMS

[75] Inventors: Jean Pierre Lazzari, Seyssinet; Igor Melnick, Grenoble; Jean-Yves Valet, Seyssinet, all of France

[73] Assignee: Commissariat a l'Energie Atomique, Paris, France

[21] Appl. No.: 677,433

[22] Filed: Apr. 15, 1976

Related U.S. Patent Documents

Reissue of:

[64] Patent No.: 3,723,665
Issued: Mar. 27, 1973
Appl. No.: 81,881
Filed: Oct. 19, 1970

[30] Foreign Application Priority Data

Oct. 28, 1969 France ..... 69.36863

[51] Int. Cl.[2] ..... G11B 5/20; G11B 5/22; G11B 5/42

[52] U.S. Cl. ..... 360/123; 360/119; 360/120; 360/125

[58] Field of Search ..... 360/123, 119–121, 360/124–127

[56] References Cited

U.S. PATENT DOCUMENTS

| | | | |
|---|---|---|---|
| 3,271,751 | 9/1966 | Proebster | 360/123 |
| 3,344,237 | 9/1967 | Gregg | 360/123 |
| 3,495,325 | 2/1970 | Bos et al. | 360/121 |
| 3,564,522 | 2/1971 | Stevens, Jr. | 360/125 |
| 3,564,558 | 2/1971 | Tolman et al. | 360/119 |

OTHER PUBLICATIONS

IBM Technical Disclosure Bulletin, D. A. Thompson, Multi-Gap Recording Head, vol. 12, No. 10, Mar. 1970, p. 1555.

*Primary Examiner*—Alfred H. Eddleman
*Attorney, Agent, or Firm*—Cameron, Kerkam, Sutton, Stowell & Stowell

[57] ABSTRACT

The open-loop magnetic circuit of an integrated magnetic head for reading and/or writing is made up of two magnetic films which are joined together at one end, the other end being placed in proximity to the writing and/or reading surface and substantially at right angles thereto. In order to form the electric winding for writing and/or reading, the magnetic head comprises within said loop and in an alternate arrangement a succession of electrically conducting and electrically insulating film layers which are at least partially superposed in a direction substantially at right angles to the plane of the two magnetic films.

7 Claims, 4 Drawing Figures

INTEGRATED MAGNETIC HEAD HAVING ALTERNATE CONDUCTING AND INSULATING LAYERS WITHIN AN OPEN LOOP OF TWO MAGNETIC FILMS

Matter enclosed in heavy brackets [ ] appears in the original patent but forms no part of this reissue specification; matter printed in italics indicates the additions made by reissue.

This invention relates to an integrated magnetic head which serves either to write or to read information on a supporting medium. The invention is also directed to a method of manufacture of said head.

In general, a magnetic reading and/or writing head consists of two essential parts: a magnetic circuit having a magnetic discontinuity which will be designated hereinafter as a "gap" and one or a number of electric windings which surround said circuit and are intended to permit writing and/or reading. In order to increase the potentialities of recording systems, the performances of magnetic heads must be improved from the point of view of frequency of use, values of the writing field and the reading signal, accuracy and thinness of the gap. The achievement of these qualities calls for more elaborate materials and more complex methods of machining, thereby considerably increasing the cost price of heads. It thus becomes necessary to increase performances while at the same time reducing capital expenditure and this leads to the design of integrated magnetic heads. Heads of this type have already been produced and mention can be made of two devices which bear the closest resemblance to the present invention.

In the first device, provisions is made for a magnetic film located in a plane at right angles to that of the recording surface. A number of leads which form part of the recording coils are deposited on said magnetic film in adjacent relation and a second magnetic film is deposited on the complete assembly, thereby closing the magnetic circuit at one end of the films; at the other end, the gap is formed by a layer of dielectric material which is placed between the two magnetic films. However, the efficiency of heads which are manufactured in this manner is very low and their construction is open to strong criticism.

In the second device, a magnetic film is deposited around a conductor and a slit is then made in the magnetic material in order to form the gap. However, heads of this type can be employed in practice only for writing information on a supporting medium and not for reading such information since the signal-to-noise ratio is particularly low and the gap is badly defined.

The invention provides an integrated magnetic head and a method of manufacture of said head which correspond to practical requirements more effectively than was the case in the prior art. In particular, the performances of heads in accordance with the invention are distinctly improved, especially in regard to coefficient of transfer, frequency of writing and/or reading and a relatively low cost price.

To this end, the invention proposes an integrated magnetic head for reading and/or writing in which the magnetic circuit in the form of an open loop is constructed of two magnetic films which are joined together at one end and disposed at the other end in proximity to the writing and/or reading surface substantially at right angles to said surface. In order to form the electric winding for writing and/or reading, said head essentially comprises within said loop and in an alternate arrangement a succession of electrically conducting and electrically insulating film layers which are at least partially superposed in a direction substantially at right angles to the plane of said magnetic films.

The invention is also concerned with a method of manufacture of said magnetic head which essentially consists in forming said magnetic, electrically conducting and insulating layers by vacuum evaporation of thin films.

A better understanding of the invention will be obtained from the following description of two modes of execution of the invention which are given by way of example and not by way of limitation, reference being made to the accompanying drawings, in which.

Figure 1:
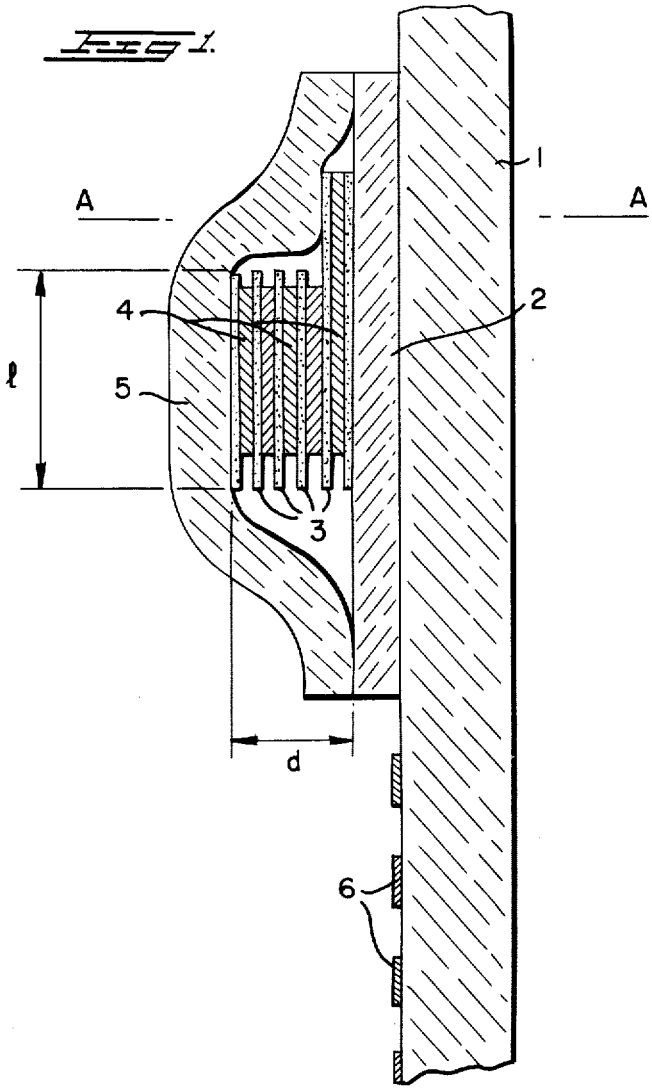
FIG. 1 is a sectional view of the magnetic head, this view being taken along a plane P.

The integrated magnetic head is mainly composed of thin films of different materials which are evaporated in a vacuum and on a substrate as designated by the reference numeral 1 in FIG. 1 which represents a cross-section of the magnetic head along a plane P. Said substrate 1 can be either metallic, dielectric, semi-conducting or of plastic material. A film 2 of magnetic material is deposited on the substate 1. There is then formed an alternate stack of films 3 and 4 which are respectively electrically insulating and conducting so that a conducting film 4 is always located between two insulating films 3. It is noted that the first two insulating film layers 3 and the first conducting layer 4 are slightly displaced towards the exterior of the head with respect to the other layers. A film 5 formed of magnetic material which is identical with that of the film 2 is then deposited on the set of layers 3 and 4 so that the films 2 and 5 thus form a loop. Electric conductors 6 are deposited on the substrate 1 in order to provide an electric contact with the conducting layers 4 and the set of layers 4 and 6 thus forms a winding. The magnetic head is subsequently coated with a polymerizable resin which ensures its protection, then cut so as to be brought level along the section plane A. There is thus formed a gap composed of two insulating layers 3 separated by a conducting layer 4. The existence of said conducting layer has a beneficial function at high frequency as a result of the appearance of induced currents which prevent closure of the flux; said layer results on the one hand in a reduction in high-frequency losses and on the other hand makes is possible to bring the head nearer to the film base on which the writing and/or reading is performed. The loop formed by the magnetic films 2 and 5 is thus open at one end. At this open end, the magnetic head accordingly assumes a convergent shape.

Figures 2, 3:
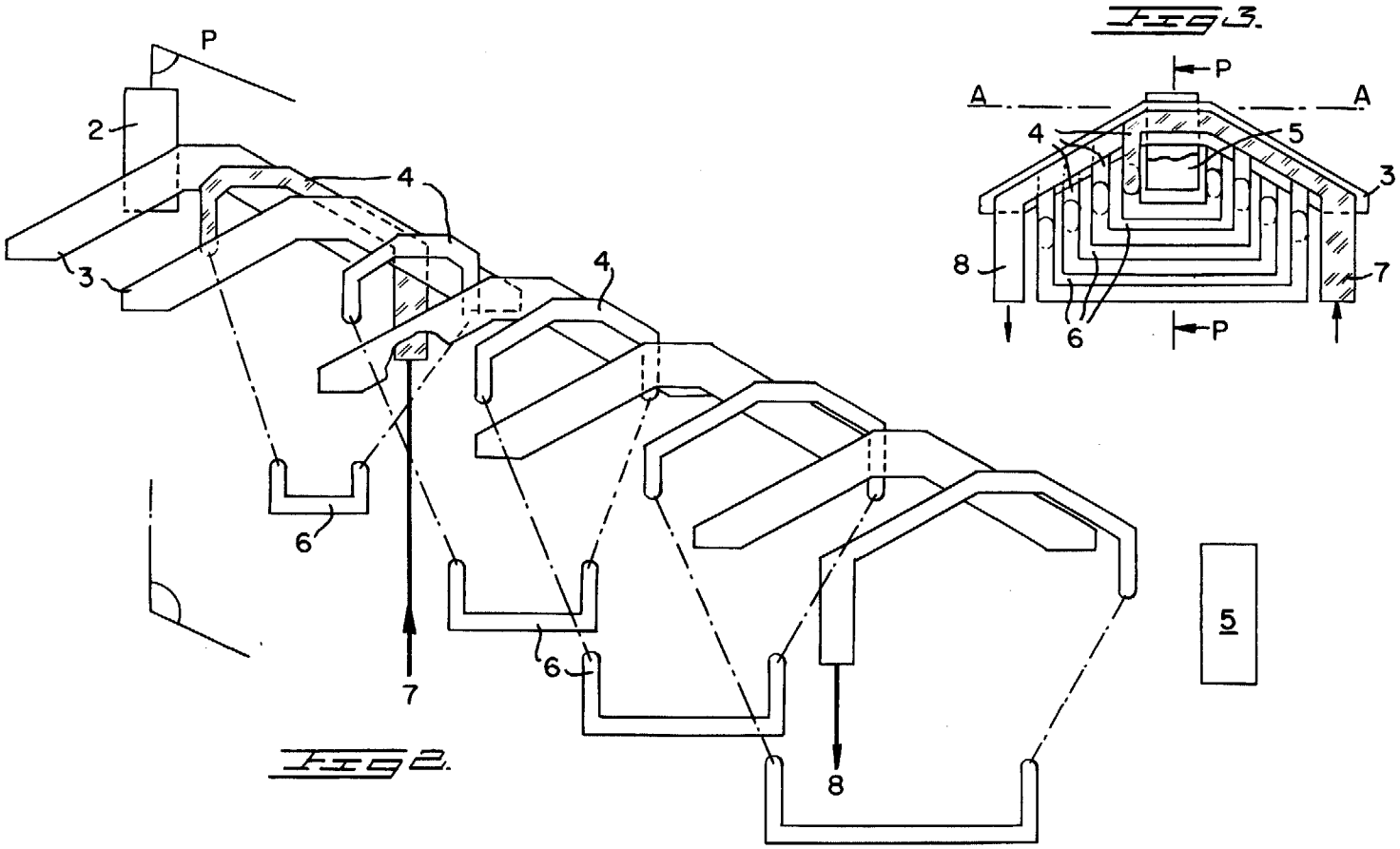
FIG. 2 is a synoptic view showing the assembly of the different thin films which mainly constitute the magnetic head.
FIG. 3 is a front view of the magnetic head.

In FIG. 2 which represents a synoptic view of the different successive film layers consisting of magnetic, conducting or insulating layers, it is observed that the "active" portion of the head is constituted by an envelope formed by the magnetic films 2 and 5 which contain the different insulating layers 3 and conducting layers 4. The conducting layers 4, the number of which is chosen as a function of the desired performances are five in number in the example of FIG. 2 and are separated from each other by insulating layers 3. The conductors 6 which are thin films having the shape of yokes are then deposited on the substrate 1. The chain-dotted lines connecting one of the two ends of each conducting layer 4 with one of the two ends of each conductor 6 indicate the points of contact by overlapping of the conducting layers 4 and of the conductors 6. The shape of the conducting layers 4 and of the conductors 6 as well as the dimensions of the conductors 6 have been chosen so that the assembly which is constituted by the layers 4 and 6 forms only a single electrically conductive winding having five turns. The arrows 7 and 8 indicate the input and/or output of electric current in the winding. The insulating layers 3 all have the same shape.

In FIG. 3 which is a front view of the integrated magnetic head, the magnetic films 2 and 5 are shown in superposed relation. The winding formed by the conductors 6 and by the conducting layers 4 is shown very clearly. The different insulating layers as well as a part of the conducting layers 4 are superposed; the other non-superposed part of the conducting layers 4 is employed for a connection with the conductors 6. The input and output of the current are represented by the arrows 7 and 8. The chain-dotted lines indicate the section plane along which the head is cut and then levelled down.

The dimensions of the magnetic films 2 and 5 are 500 $\mu \times 300\ \mu \times 6\ \mu$. The magnetic material is anisotropic and its axis of hard magnetization is directed at right angles to the recording film which is perpendicular to the substrate 1. The electric insulating layers are films which have a width of 200 $\mu$, a thickness of 1 $\mu$, and are fabricated from $SiO_2$. The conducting layers 4 are films which have a width within the range of 50 $\mu$ to 100 $\mu$ and a thickness of 1 $\mu$; said layers are formed either of copper or aluminum. The magnetic material is a nickel-iron alloy. The substrate 1 is formed of glass and has a thickness of 4/10 mm. Since the gap is formed in the direction of the thickness of the layers 2, 3 and 4, it is possible to reduce said gap to dimensions very much smaller than 1 $\mu$ with only one layer 3 within the gap or on the contrary to widen said gap to values in excess of 5 $\mu$. It should be noted that the plane of the head is not essentially perpendicular to that of the recording track and a small angle about this direction may be contemplated if this should prove necessary. The magnetic heads are entirely fabricated by vacuum evaporation of thin films in the same pumping cycle.

The coefficient of transfer T of the magnetic head can be defined by the following relation:

$$T = \rho m/\rho t,$$

wherein $\rho t$ represents the magnetic flux which enters at the level of the gap of the head and $\rho m$ represents the magnetic flux which produces a reading signal. In order that the coefficient of transfer T should be of maximum value, it is shown that four conditions must be satisfied:

substantial thickness and high permeability of the magnetic films 2 and 5, a value of d which represents in FIG. 1 the thickness of the internal portion of the magnetic circuit and which should be as high as possible, value of 1 which represents in FIG. 1 the length of the magnetic head and which should be as low as possible.

This shows that, on the one hand, the choice of the magnetic material is very important. Accordingly, advantageous use can be made of magnetic films as described in the co-pending French patent filed in the name of Commissariat a l'Energie Atomique and entitled: "Magnetic circuit having low reluctance." Moreover, when the number of conducting layers 4 is increased as is entirely feasible in accordance with this method, the value of d increases with respect to the value of 1 and the coefficient of transfer T comes close to unity. Furthermore, the thickness of the magnetic films (of the order of 1 $\mu$) cannot be considered infinite with respect to the width of the gap as in conventional magnetic heads. This property plays a part in increasing the resolution of the writing and reading process. In a magnetic head according to the invention, the main magnetic flux is employed and not the leakage flux of the head as in a conventional head. In fact, the direction in which the permeability is of maximum value is at right angles to the writing and/or reading surface. Finally, the short magnetic path and the small magnetic quantity employed permit of enhanced efficiency and frequency performances of the head.

Magnetic heads which have been constructed in accordance with the invention have exhibited an ohmic resistance of 5 ohms and an induction of 0.12 $\mu$ H, stray capacitances being of the order of 20 pF. Recordings made on magnetic films of chromium-cobalt alloy having a magnetic field strength of 400 Oersteds and a thickness of 0.2 $\mu$ have been made with heads in accordance with the invention, the results obtained being as follows:

distance from head to track; 4 $\mu$ width of gap: 1.5 $\mu$ optimum writing current: 300 mA at the time of reading, a separate transition has a width of 10 $\mu$ at one-half the height with a signal of 20 microvolts in respect of a rate of transfer of the information medium of 50 cm per second. In the case of a rate of 50 m/sec. which is employed in computers, the signal is 2 mV.

Figure 4:
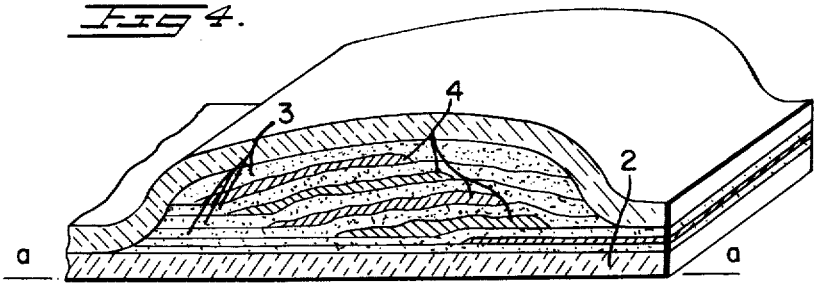
FIG. 4 is a view in perspective showing a second embodiment of the magnetic head.

It should be noted that fabrication of the head shown in FIG. 1 in the form of deposited films presents a practical difficulty at the level of the "step" which is present between the initial films which are displaced towards the exterior and the stack of the other films as well as between said stack and the first magnetic film 2; there is a potential danger of rupture or constriction of the magnetic film 5. In order to prevent this possibility, it will accordingly be preferable to make use of the configuration shown in FIG. 4 in which the conducting layers overlap only to a partial extent.

The present invention is not limited to the two embodiments which have been described by way of explanation with reference to the drawings. For example, the shape of the film layers 2, 3, 4 and 6 is given only by way of indication. In the example mentioned, the gap is constituted by a conducting layer surrounded by two insulating layers although it remains wholly apparent that this structure represents only one particular form of embodiment. Provision can naturally be made for a varied number of layers 3 and 4. In particular, a single layer 3 is sufficient to delimit the gap which can be made narrower than in the cofiguration of FIG. 1. The resolution is thus increased at the expense of the high-frequency performances mentioned above. In some cases, this configuration can prove advantageous. The construction of the coil which is constituted by the layers 4 ad 6 is one particular form of construction and other forms can be given to this winding. The arrows 7 and 8 indicate the direction of propagation of electric current within the winding but this direction can be reversed.

What we claim is:

1. An integrated magnetic head for reading and/or writing, a magnetic circuit for said head comprising an open loop of two magnetic films joined together at one end and disposed at the other end in proximity to the wiring and/or reading surface and substantially at right angles to said surface, and an electric winding for writing and/or reading within said loop comprising in an alternate arrangement a succession of electrically conducting and electrically insulating film layers at least partially superposed in a direction substantially at right angles to the plane of said magnetic films, wherein said loop has a convergent shape at the level of the opening of said open loop, wherein an electrically conducting layer having its two faces adjacent to two electrically insulating layers is level with the open end of said loop forming a gap, the other layers being set back towards the interior of said loop.

[2. A magnetic head according to claim 1, wherein an electrically insulating layer is level with the open end of said loop and forming a gap, the other layers being set back towards the interior of said loop.]

3. A magnetic head according to claim [2] *1* wherein said conducting layers are displaced with respect to each other towards the interior of said loop.

4. A magnetic head according to claim 1, wherein said conducting layers are joined together at the rear end of said magnetic head and extend in superposed relation in the place of said head forming an electrically conductive winding.

5. A magnetic head according to claim 1, wherein said magnetic layers are a Fe-Ni-Cr alloy.

6. A magnetic head according to claim 1, wherein said electrically insulating layers are $SiO_2$.

7. A magnetic head according to claim 1, wherein said electrically conducting layers are selected a metal from a group consisting of aluminum and copper.

*8. An integrated magnetic head for reading and/or writing, a magnetic circuit for said head comprising an open loop of two magnetic films joined together at one end and disposed at the other end in proximity to the writing and/or reading surface and substantially at right angles to said surface, and an electric winding for writing and/or reading within said loop comprising in an alternate arrangement a succession of electrically conducting and electrically insulating film layers at least partially superposed in a direction substantially at right angles to the plane of said magnetic films, wherein said loop has a convergent shape at the level of the opening of said open loop, wherein an electrically insulating layer is level with the open end of said loop forming a gap, the other layers being set back towards the interior of said loop.*

* * * * *

UNITED STATES PATENT AND TRADEMARK OFFICE

CERTIFICATE OF CORRECTION

PATENT NO. : Re 29,326

DATED : July 26, 1977

INVENTOR(S) : Jean Pierre Lazzari, Igor Melnick & Jean-Yves Valet

It is certified that error appears in the above-identified patent and that said Letters Patent are hereby corrected as shown below:

[73] Assignee: Commissariat a l'Energie Atomique and Compagnie Internationale Pour l'Informatique, Louveciennes, France Signed and Sealed this

*Twenty-first* Day of *February 1978*

[SEAL]

*Attest:*

RUTH C. MASON
*Attesting Officer*

LUTRELLE F. PARKER
*Acting Commissioner of Patents and Trademarks*